(12) United States Patent
Schulte et al.

(10) Patent No.: US 6,241,098 B1
(45) Date of Patent: Jun. 5, 2001

(54) DRILLING FLUID TREATMENT OPERATIONS AND APPARATUSES

(75) Inventors: David L. Schulte, Broussard, LA (US); Guy L. McClung, III, Spring, TX (US)

(73) Assignee: Tubo Scope I/P, Inc., Houston, TX (US)

(*) Notice: Subject to any disclaimer, the term of this patent is extended or adjusted under 35 U.S.C. 154(b) by 0 days.

(21) Appl. No.: 09/605,356

(22) Filed: Jun. 28, 2000

Related U.S. Application Data

(63) Continuation of application No. 09/344,145, filed on Jun. 24, 1999, now abandoned.

(51) Int. Cl.⁷ .................................................. B07B 1/49
(52) U.S. Cl. ...................... 209/401; 209/403; 209/405; 209/397; 209/399
(58) Field of Search .................................. 209/397, 399, 209/403, 405, 408, 409, 412, 401

(56) References Cited

U.S. PATENT DOCUMENTS

| | | | |
|---|---|---|---|
| 1,947,307 | 2/1934 | Rafton | 209/275 |
| 3,684,091 | 8/1972 | Wehner | 209/403 |
| 4,033,865 | 7/1977 | Derrick, Jr. | 209/275 |
| 4,575,421 | 3/1986 | Derrick et al. | 209/397 |
| 4,819,809 | 4/1989 | Derrick | 209/275 |
| 4,857,176 | 8/1989 | Derrick et al. | 209/392 |
| 4,882,054 | 11/1989 | Derrick et al. | 210/389 |
| 5,211,291 | 5/1993 | Kelley et al. | 209/680 |
| 5,221,008 | 6/1993 | Derrick, Jr. et al. | 209/269 |
| 5,330,057 | 7/1994 | Schiller et al. | 209/392 |
| 5,384,044 | 1/1995 | Burgess | 210/346 |
| 5,417,793 | 5/1995 | Bakula | 156/308.2 |
| 5,417,858 | 5/1995 | Derrick et al. | 210/388 |
| 5,417,859 | 5/1995 | Bakula | 210/388 |
| 5,636,749 | 6/1997 | Wojciechowski | 209/403 |
| 5,690,826 | 11/1997 | Cravello | 210/384 |
| 5,720,881 | 2/1998 | Derrick et al. | 210/388 |
| 5,783,077 | 7/1998 | Bakula | 210/388 |

(List continued on next page.)

FOREIGN PATENT DOCUMENTS

| | | | |
|---|---|---|---|
| 0 169 698 | 7/1985 | (EP) | B07B/1/46 |
| WO 95/23655 | 3/1994 | (WO) | B07B/1/46 |

OTHER PUBLICATIONS

H & K Perforated Materials, Harrington and King, Catalog 105, 1988.
Mud Equipment Manual, Handbook 3: Shale Shakers, Brandt et al, Gulf Publishing Co., 1982.

*Primary Examiner*—Donald P. Walsh
*Assistant Examiner*—Jonathan R. Miller
(74) *Attorney, Agent, or Firm*—Guy McClung

(57) ABSTRACT

An assembly has been invented for a vibratory shaker for screening material flowing thereto, which according to certain aspects of the present invention has a panel with a plurality of spaced-apart holes therethrough, a plurality of strips spaced-apart thereon and defined by the plurality of holes, the strips in a first plane, a plurality of crossmembers each of which has two ends, one end connected to one of the strips and the other end connected to another strip, the crossmembers in a plane different from that of the first plane. In embodiments of a screen assembly according to the present invention, there is screening material on such a panel.

A support strip system has been invented for a panel of a screen used in a vibratory shaker, which has at least two strips defined by spaced-apart holes through a panel, each strip in a plane, and at least one crossmember, the crossmember having two ends, one end connected to one of the strips and the other end connected to the other strip, the crossmember(s) in a plane different from the plane or planes of the strips.

25 Claims, 7 Drawing Sheets

U.S. PATENT DOCUMENTS

| | | | |
|---|---|---|---|
| 5,814,218 | 9/1998 | Cagle | 210/388 |
| 5,816,413 | 10/1998 | Boccabella et al. | 209/399 |
| 5,868,929 | 2/1999 | Derrick et al. | 210/388 |
| 5,876,552 | 3/1999 | Bakula | 156/308.2 |
| 5,944,993 | 8/1999 | Derrick et al. | 210/388 |
| 5,950,841 | 9/1999 | Knox et al. | 209/315 |
| 5,958,236 | 9/1999 | Bakula | 210/388 |
| 5,967,336 | 10/1999 | Baltzer et al. | 209/403 |
| 6,000,556 | 12/1999 | Bakula | 210/388 |
| 6,000,558 | 12/1999 | Proulx et al. | 210/486 |
| 6,161,700 | 12/2000 | Bakula | 209/401 |

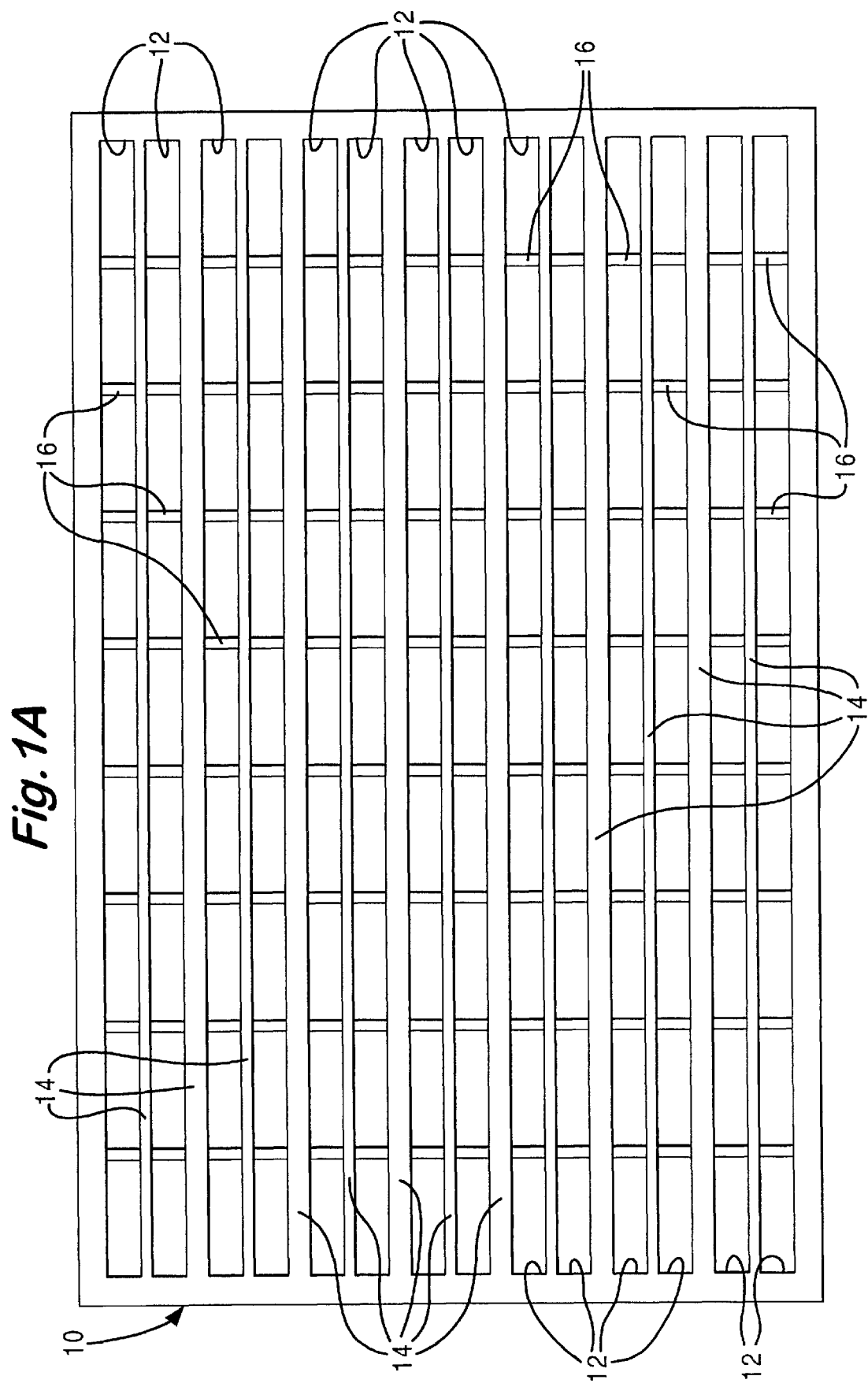

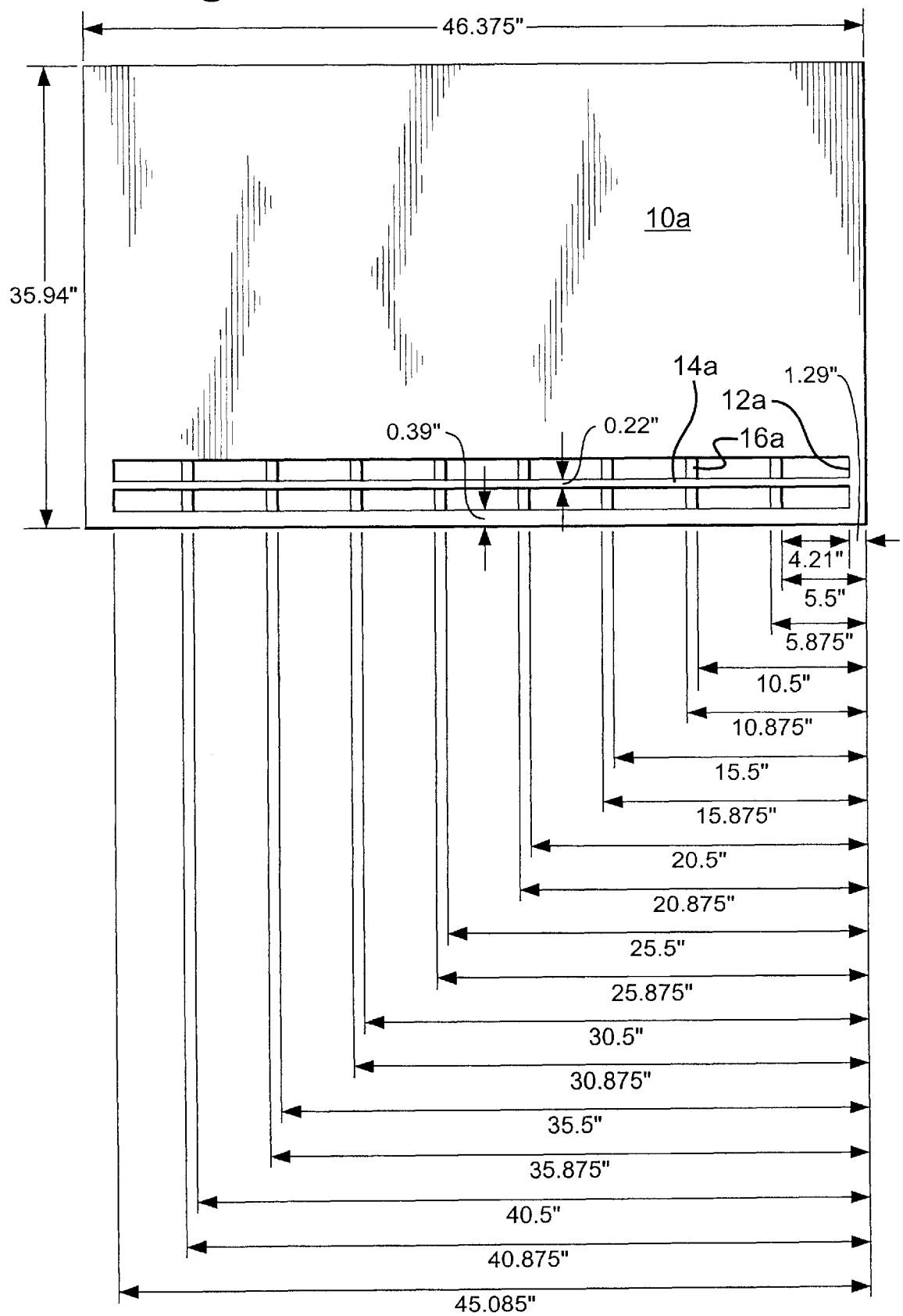

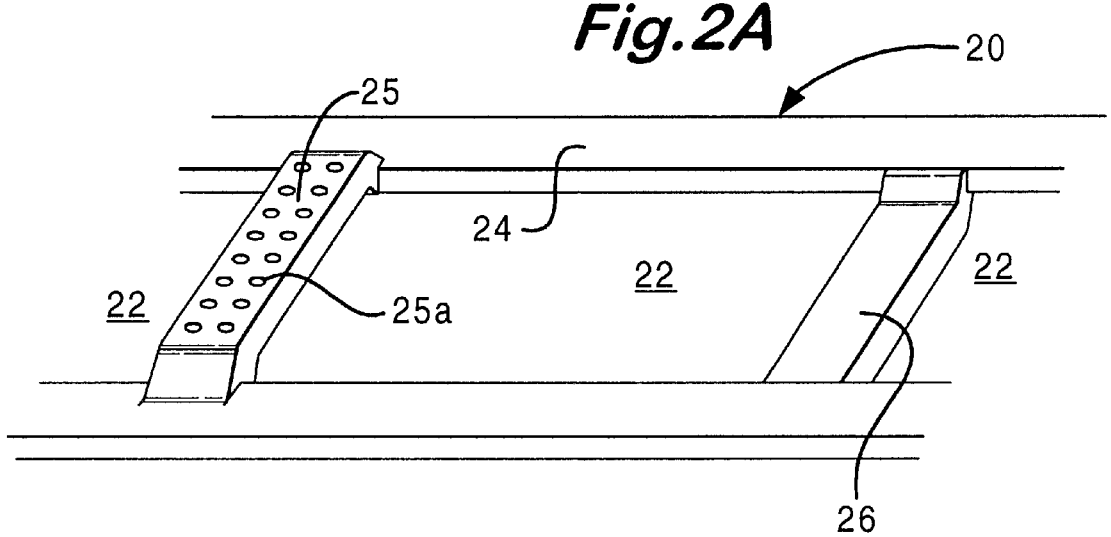
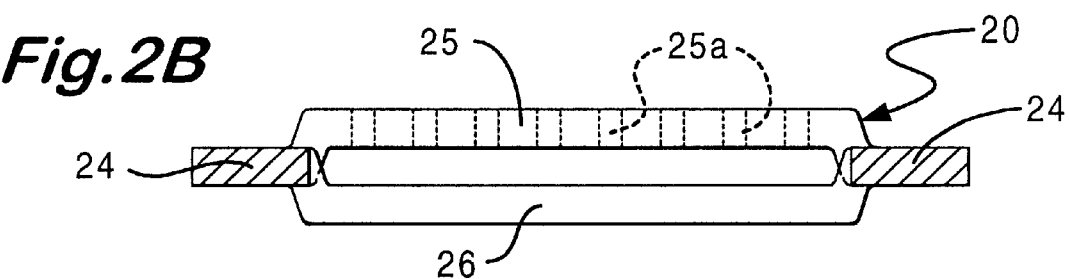
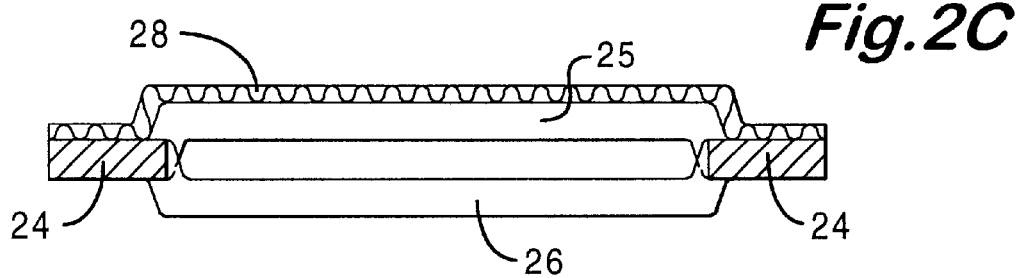
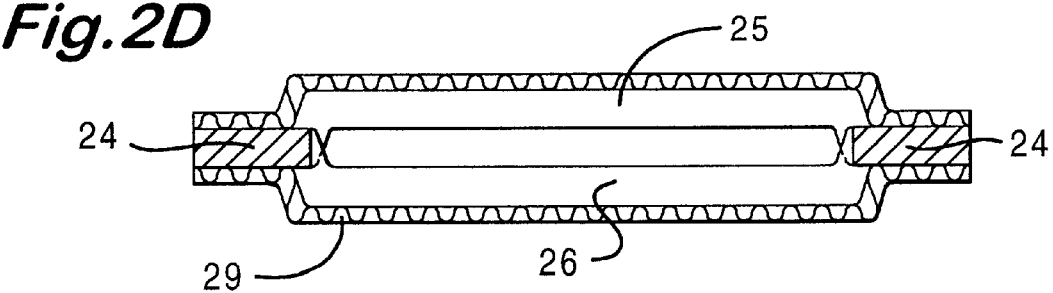

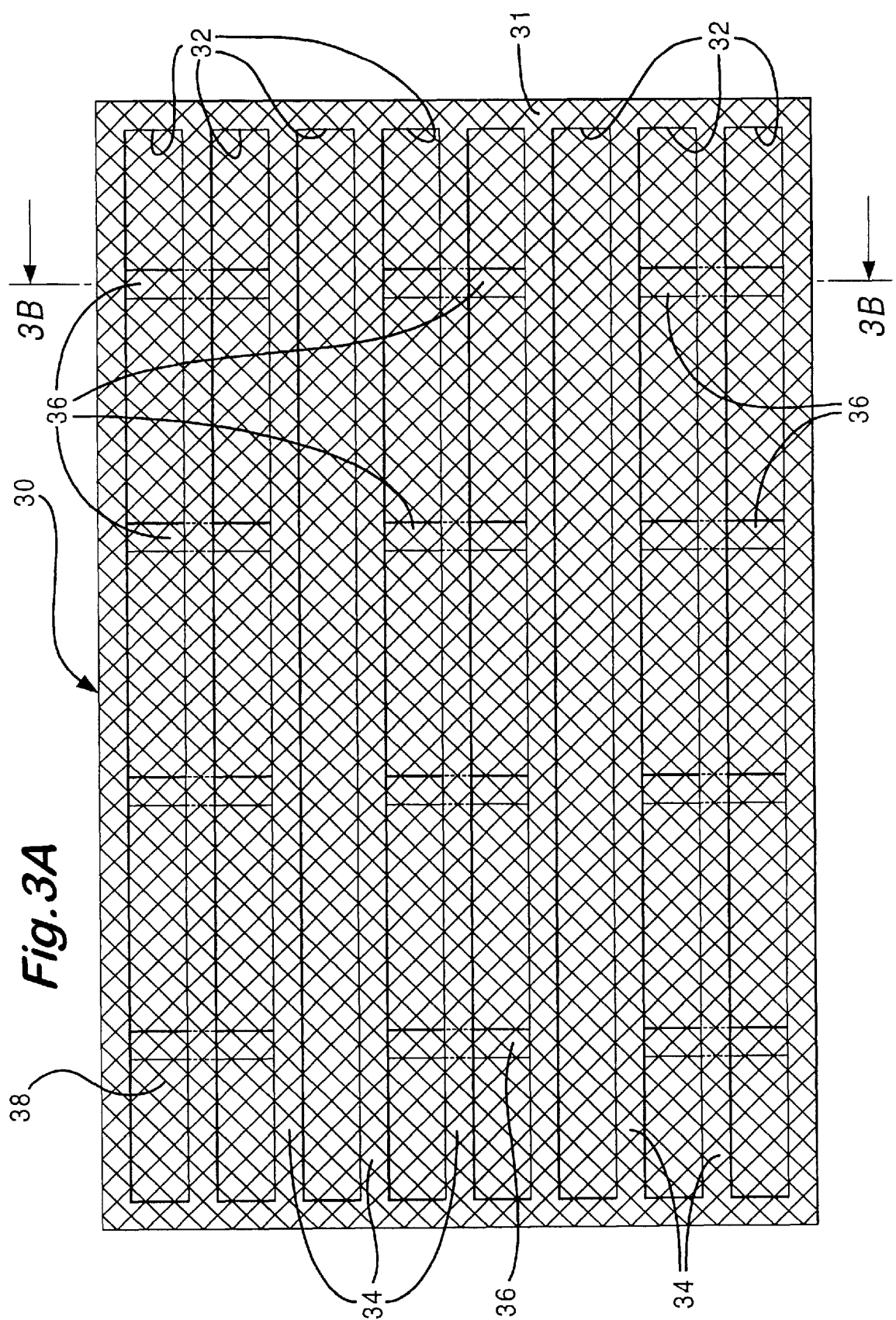

DRILLING FLUID TREATMENT OPERATIONS AND APPARATUSES

RELATED APPLICATION

This is a continuation of U.S. application Ser. No. 09/344,145 filed Jun. 24, 1999 now abandoned entitled "Vibratory Separator Operations And Apparatus" which is incorporated fully herein for all purposes.

BACKGROUND OF THE INVENTION

1. Field Of The Invention

The present invention is directed to filtering and classifying material with vibratory separators; to screens for such separators including, but not limited to, shale shakers; to such apparatuses useful for both dewatering and classification; and methods of screen tensioning, repair and assembly.

2. Description of Related Art

Vibrating screens have been employed for many years to separate particles in a wide array of industrial applications. One common application of vibrating screens is in drilling operations to separate particles suspended in drilling fluids. The screens are generally flat or three-dimensional and are mounted generally horizontally on a vibrating mechanism or shaker that imparts either a rapidly reciprocating linear, elliptical and/or circular motion to the screen. Material from which particles are to be separated is poured onto a back end of the vibrating screen, usually from a pan mounted above the screen. The material generally flows toward the front end of the screen. Large particles are unable to move through the screen remaining on top of the screen and moving toward the front of the screen where they are collected. The smaller particles and fluid flows through the screen and collects in a pan beneath the screen.

A vibrating screen may be formed from one or more layers of screen and/or wire mesh which are generally described with reference to the diameter of the wires from which they are woven, the number wires per unit length (called a mesh count) and the shape or size of the openings between wires. The type of mesh chosen depends on the application.

Some screens use wire mesh that is tensioned. Tensioning restricts movement of the wires and assists in holding the shape of the wire mesh, keeping the size of the openings consistent. A variety of problems are associated with correct tensioning of screens.

Multiple layers of mesh may be used to alleviate blinding. U.S. Pat. No. 4,033,865, describes layering two meshes in a manner that results in at least one wire of the lower of the two meshes bisecting each opening in the upper mesh. A third "backing" layer of relatively coarse, mill grade mesh is often used to carry most of the load on the screen and to increase the tensile strength of the screen.

Another problem faced in many applications is the tearing of a screen. The problem can be especially acute in heavy duty applications such as drilling and mining. A torn screen must be replaced or repaired. To facilitate repair, the screen layers are bonded to a rigid or semi-rigid support panel that has a pattern of openings, forming on the screen a plurality of cells of wire mesh. When a tear occurs in the screen, the mesh remaining within the cell in which the tear occurred is cut out and the cell is plugged. The capacity of the screen is diminished but its life is extended. Typically, several cells of a screen can be repaired before its capacity drops far enough to require replacement. Unfortunately, bonding the screen all around the edges defining openings through the support panel further restricts relative movement of the layers and the wires in each mesh layer.

Blinding and tearing of a screen reduce the capacity of the screen continually through its useful life. Although capacity can be increased by increasing the total area the screens, the size of the screen is limited in most applications, such as on drilling rigs, especially those on offshore platforms. There has thus been generally a trade-off between capacity, longevity, repairability and resistance to blinding of the screens.

There has long been a need, recognized by the present inventors, for a vibratory separator screen which does not require openings defined by edges or members all of which are in the same plane.

SUMMARY OF THE PRESENT INVENTION

A screen panel has, in certain embodiments, a panel with a plurality of spaced-apart holes therethrough, a plurality of spaced-apart strips on the panel and defined by the plurality of holes, each strips in a plane, a plurality of crossmembers each of which has two ends, one end connected to one of the strips and the other end connected to another strip, the crossmembers in a plane different from that of the plane or planes of the strips. In one aspect the panel has screening material thereon.

A panel for a screen for a vibratory shaker, according to certain aspects of the present invention, has a body with a plurality of spaced-apart holes therethrough, a plurality of strips spaced-apart thereon and defined by the plurality of holes, the strips in a first plane, and a plurality of crossmembers each of which has two ends, one end connected to one of the strips and the other end connected to another strip, the crossmembers in a plane beneath or above the first plane.

A support strip system for a panel of a screen used in a vibratory shaker, according to the present invention, has at least two strips defined by spaced-apart holes through a panel, the strips in a first plane, and at least one crossmember, the crossmember having two ends, one end connected to one of the strips and the other end connected to the other strip.

The present invention, in certain embodiments, discloses a screen for a vibratory shaker for screening material flowing thereto, the screen having a panel with holes therethrough in a first plane, the holes defining a plurality of strips or ribs in the first plane extending generally in one direction, and a plurality of crossmembers linking the strips or ribs, the crossmembers substantially in another plane with ends extending up or down to the first plane of the ribs or strips.

In one aspect screening material (any known screen or mesh in any known number of layers connected to and/or adhered to and/or bonded and/or glued and/or welded together in any known way, or not connected together) is positioned on a panel according to the present invention either above or below (or both) the crossmembers. In certain aspects, the screening material is connected to, adhered to, welded to, glued to, and/or bonded to (all collectively herein henceforth referred to as "connected to") the ribs or strips only, or only to a portion or each rib and/or each strip. In another aspect, the screening material is connected to the strips or ribs and to the crossmembers. In another aspect the screening material is connected to only select ones of the strips or ribs and/or to only select ones of the crossmembers. In another aspect the screening material is connected to only the crossmembers. In embodiments disclosed herein with "screening material the screening material represents, inter alia, any screening material described above, including but not limited to, a single layer or multiple layers of such material.

In certain embodiments of the present invention screening material is positioned on only one side of a panel, e.g. the top side or the bottom side. In other aspects, there is screening material on the top side and on the bottom side—either side of which or both which may be connected to the panel. In those embodiments in which the screening material is not connected in such a way as to provide connection to both strips/ribs and crossmembers, the connection is sufficient (whether to strips/ribs only or to crossmembers only) to provide desired tensioning inn the screening material.

In certain aspects a screen according to the present invention is a three-dimensional type screen with a panel's first plane and/or screening material having, as viewed from the end, a corrugated or undulating shape defining a plurality of interspersed hills and valleys. It is also within the scope of this invention for the first plane of the panel to be substantially flat and for screening material thereon to be corrugated or undulating.

Certain embodiments of this invention are not limited to any particular individual feature disclosed here, but include combinations of them distinguished from the prior art in their structures and functions. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods.

The present invention recognizes and addresses the previously-mentioned problems and long-felt needs and provides a solution to those problems and a satisfactory meeting of those needs. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1A is a top view of a screen panel according to the present invention.

FIG. 1C is an end view of part of the panel of

FIG. 1A.

FIG. 1G is a plan view of a particular screen panel according to the present invention.

FIG. 2A is a perspective view of part of a screen panel according to the present invention.

FIG. 2B is an end view of the panel of FIG. 2A.

FIG. 2C is an end view of the panel of FIG. 2A with screening material thereon.

FIG. 2D is an end view of the panel of FIG. 2A with screening material on two sides thereof.

FIG. 3A is a top view of a screen according to the present invention.

DESCRIPTION OF EMBODIMENTS PREFERRED AT THE TIME OF FILING FOR THIS PATENT

FIG. 1A shows a screen panel 10 according to the present invention for a vibratory separator machine. The panel 10 is made of any suitable material, [e.g., but not limited to, plastic (e.g. nylon), fiberglass, composites, metal such as, but not limited to, mild steel, stainless steel, aluminum, titanium, and brass. A series of holes 12 made through the panel 10 in any suitable manner (e.g. drilling, laser cut, sawing, punching) define a plurality of spaced-apart strips 14 that extend from one end of the panel 10 to the other. Bridging adjacent strips 14 are a plurality of spaced-apart crossmembers 16 made of any of the above listed materials and connected to the strips 14 by any suitable means or formed integrally with the strips 14 or, in one particular aspect, the panel is cast as an integral piece with the holes present. In one aspect the crossmembers 16 are glued on the strips 14.

Figure 1B:
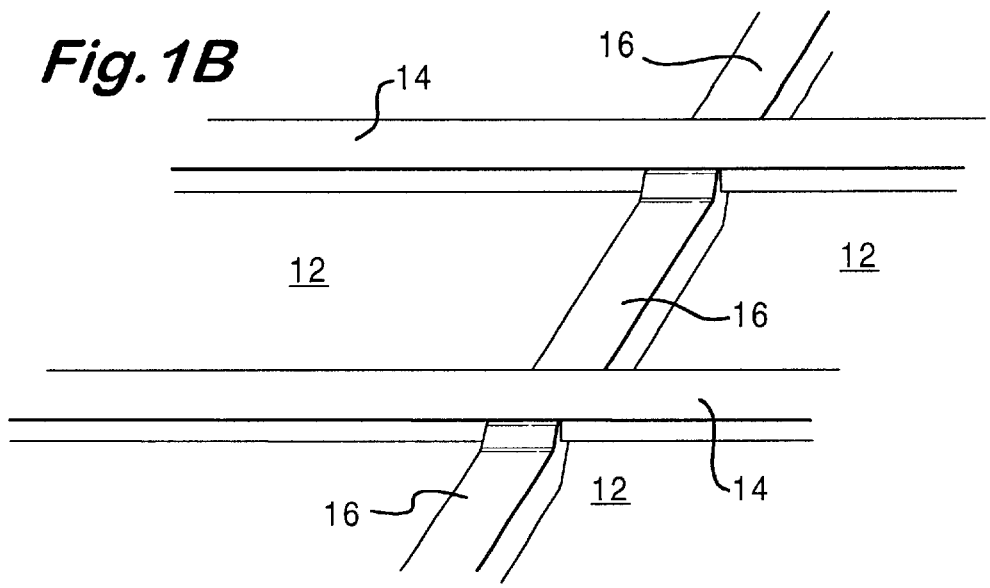
FIG. 1B is a perspective view of part of the panel of FIG. 1A.
Figure 1C:
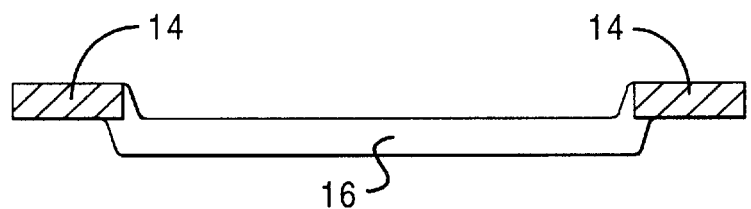

As shown in FIGS. 1A–1C, the strips 14 are all substantially in a first plane and the majority of the bodies of the crossmembers 16 are in a second plane beneath the first plane. Alternatively, the crossmembers may be in different planes. The crossmembers 16 are shown at right angles to the strips 14 but it is within the scope of this invention for the crossmembers to be at any desired angle to the strips; for different crossmembers to be at different angles to the strips; and/or for the strips to be offset with respect to the panel's perimeter (rather than substantially parallel to one set of sides, as shown, and at right angles to the panel's ends). Any screen assembly or panel disclosed herein may have crossmembers like the crossmembers 16 instead of the particular crossmembers shown and disclosed for a particular panel or screen assembly.

As shown the strips 14 are of substantially equal width, but it is within the scope of this invention to have strips of differing width.

Figure 1D:
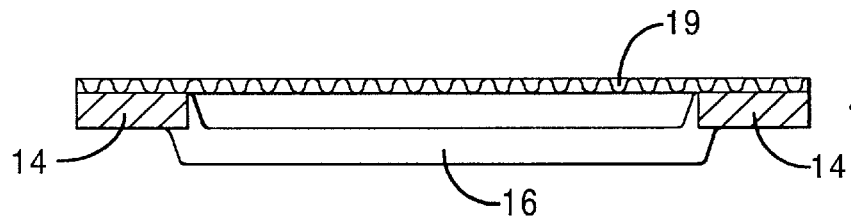
FIGS. 1D and 1E are end views of part of the panel of FIG. 1A with screening material thereon.

FIG. 1D shows part of the panel 10 with screening material 19 thereon and it is to be understood that such screening material substantially covers the panel as shown in FIG. 1A with material over all the holes 12. The screening material 19 has no contact (or only insignificant contact with the far ends of) with the crossmembers 16. As desired, the screening material may be connected to the strips 14, preferably with no connection to any crossmember 16 (or only incidental insignificant connection to the far ends thereof).

Figure 1E:
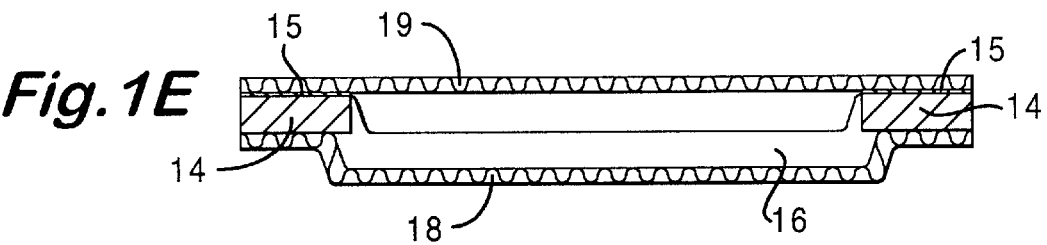
Figure 1F:
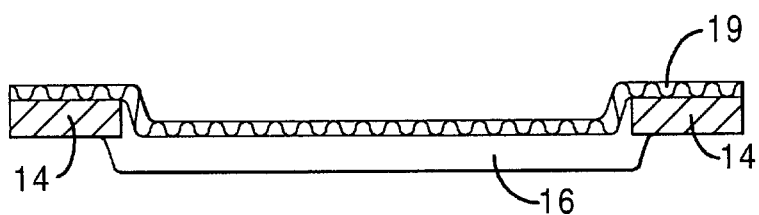
FIG. 1F is an end view that shows an alternative to the screen panel of FIG. 1D.

FIG. 1E shows a panel with screening material as in FIG. 1D, but also with screening material 18 on the bottom of the panel and going across and over (as viewed from below) the cross members 16. In such an embodiment the screening material 19 is optional. In one particular aspect, the screening material 19 is adhered to the tops of the strips 14 with a plastic grid 15 interposed between the screening material 19 and the tops of the strips 14. The plastic grid 15 has holes therethrough corresponding to openings (as viewed from above) in a panel such as the panel 12 so that upon heating and curing the plastic does not block holes and inhibit fluid flow. Such plastic grids and methods of using them to fuse or bond screen layers together and to fuse or bond screening material to metal are well known and include, but are not limited to, plastic grids such as those disclosed in U.S. Pat. No. 5,417,793 which is incorporated fully herein for all purposes. Alternatively, glue may be applied around the openings of a panel—as is well known in the art—to adhere screening material together or to a panel or parts thereof. It is to be understood that FIGS. 1D and 1E are representative of an entire panel and that a view of any two adjacent strips, etc. is like the views of FIGS. 1D and 1E, respectively. Alternatively, multiple pieces of screen (or a single screen piece with cut-outs corresponding to crossmember location) can be applied to the panel bottom so that screening material does not cover the crossmembers. FIG. 1F shows an alternative embodiment in which the screening material 19 rests on and contacts the crossmembers 16 and is, optionally, secured to the crossmembers 16 across some or all of the surface of the crossmembers 16 by any suitable known securement and/or securing material and/or method.

FIG. 1G shows one particular embodiment of a screen panel 10a, like the panel 10, with specific measurements indicated in inches. The width of a crossmember 16a is about 0.375 inches; of a strip 14a about 0.22 inches; and of a hole 12a about 0.39 inches.

FIGS. 2A and 2B illustrate an alternative screen panel 20 (partially—it being understood that an entire panel 20 looks similar to the panel 10) that has strips 24 (like the strips 14) defined by holes 22 (like the holes 12) and some crossmembers 26 (like the crossmembers 16), but also crossmembers 25 that, although they are substantially outside the plane of the strips 24, are above this plane rather than in a lower plane as are the crossmembers 26. It is within the scope of this invention to delete the crossmembers 26. It is within the scope of this invention to delete the crossmembers 26 and substitute for each of them a crossmember 25. As shown in FIG. 2A, a crossmember 25 has a series of holes or perforations 25a therethrough for fluid passage. Any crossmember disclosed herein may have one, two, or a series of a plurality of holes and/or perforations for fluid passage.

FIGS. 2C and 2D show how screening material may be applied to a panel 20. Screening material 28 is on top of the panel 20 in FIG. 2C and screening material 29 is on the bottom of the panel in FIG. 2D. The screening material 28 is optional in FIG. 2D.

FIG. 3A shows a screen assembly 30 according to the present invention with a panel 31 having a plurality of spaced-apart holes 32 therethrough that define a plurality of spaced-apart strips 34 that extend, as do the holes 32, from one end of the assembly 30 to the other.

Figure 3B:
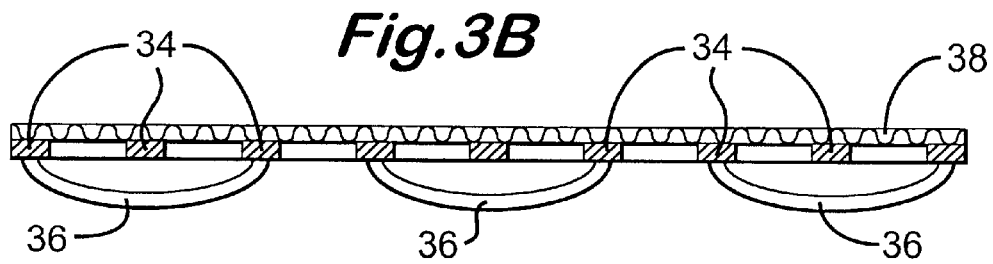
FIG. 3B is a cross-section view along line 3B—3B of FIG. 3A.

As shown in FIGS. 3A and 3B, a plurality of crossmembers 36 connect various strips 34. It is within the scope of this invention to delete one, some or all but one of the crossmembers 36. It is within the scope of this invention to delete any one, two, or three of the vertical rows of crossmembers 36 or of the horizontal rows of crossmembers 36 (vertical and horizontal as viewed in FIG. 3A).

Figure 3C:
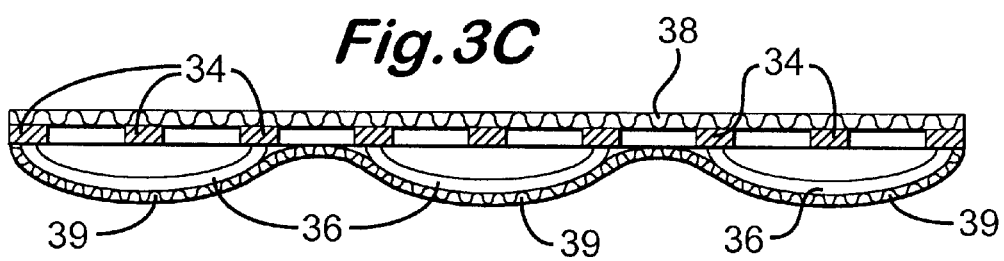
FIGS. 3C–3E are cross-section views of alternative embodiments of a screen as in FIG. 3A.

Screening material 38 is on the panel 31 and may, optionally, be connected to the strips 34 and/or to the outer perimeter of the panel 31. As shown in FIG. 3C, screening material 39 may also be used with the panel 31 (in which instance the screening material 38 is optional).

Figure 3D:
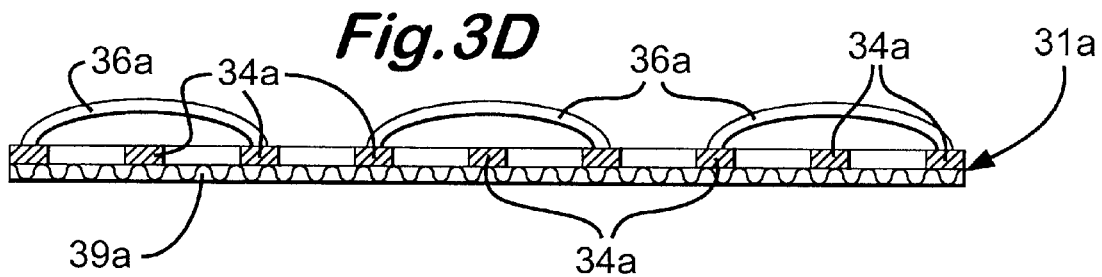
Figure 3E:
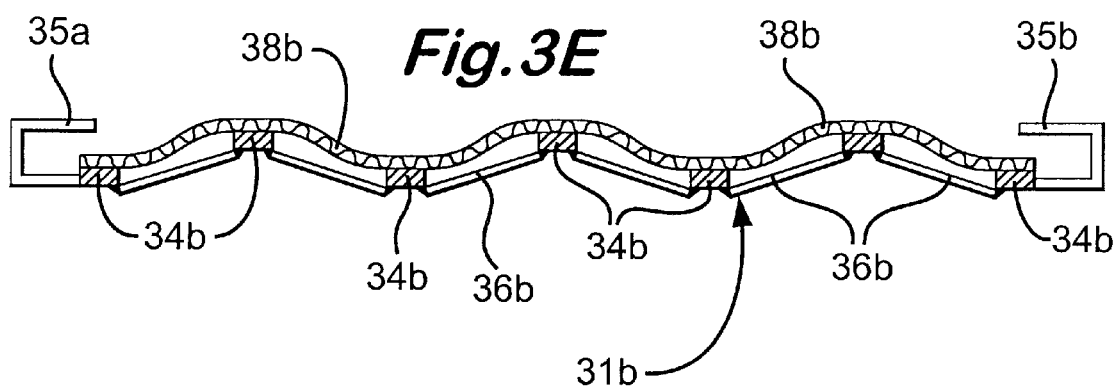

FIGS. 3D and 3E show alternatives to the panel 31 with crossmembers 36a on top of a panel 31a between strips 34a and screening material 39a (FIG. 3D); and screening material 38b (FIG. 3E) on a panel 31b. Although it is within the scope of this invention to contact and cover the crossmembers 36b in FIG. 3E with screening material, in the embodiment shown the screening material avoids and does not contact the crossmembers. Also, the strips 34b in the panel 31b are not all substantially in the same plane. As shown in FIG. 3E, the panel 31b has channels or "hookstrips" 35b. Any panel disclosed herein may have such channels or hookstrips.

Figure 4A:
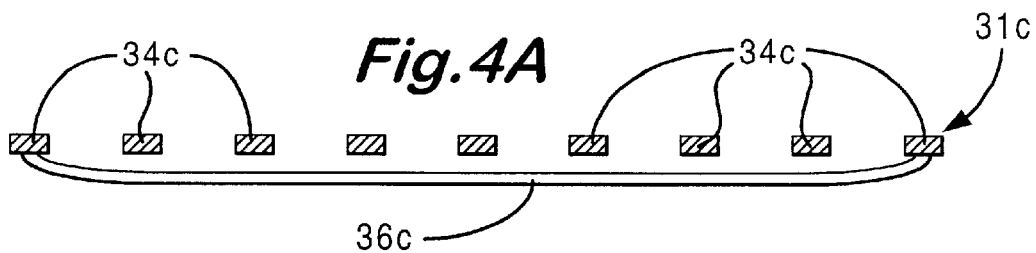
FIGS. 4A and 4B present cross-section views of various screen panels according to the present invention.
Figure 4B:
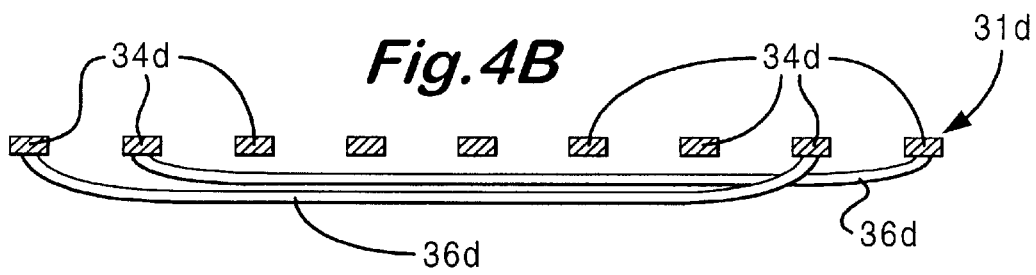

The panel alternatives of FIGS. 4A and 4B illustrate that crossmembers on any panel according to the present invention may connect adjacent strips or non-adjacent strips; that the crossmembers may be on the top of the panel, the bottom of the panel; or both; and that not all strips need to have attachment to a crossmember.

FIG. 4A shows (partially) a panel 31c (like the panels 31, 31a, and 31b) with strips 34c (like the strips 34 and 34a) interconnected with crossmembers 36c (one shown; series of spaced-apart crossmembers 36c on panel).

FIG. 4B shows (partially) a panel 31d (like the panels 31, 31a, and 31b) with strips 34d (like the strips 34 and 34a) interconnected with crossmembers 36d.

Any screening material described herein may be used on the panels of FIGS. 1A, 2A, 3A, 4A and 4B.

Figure 5A:
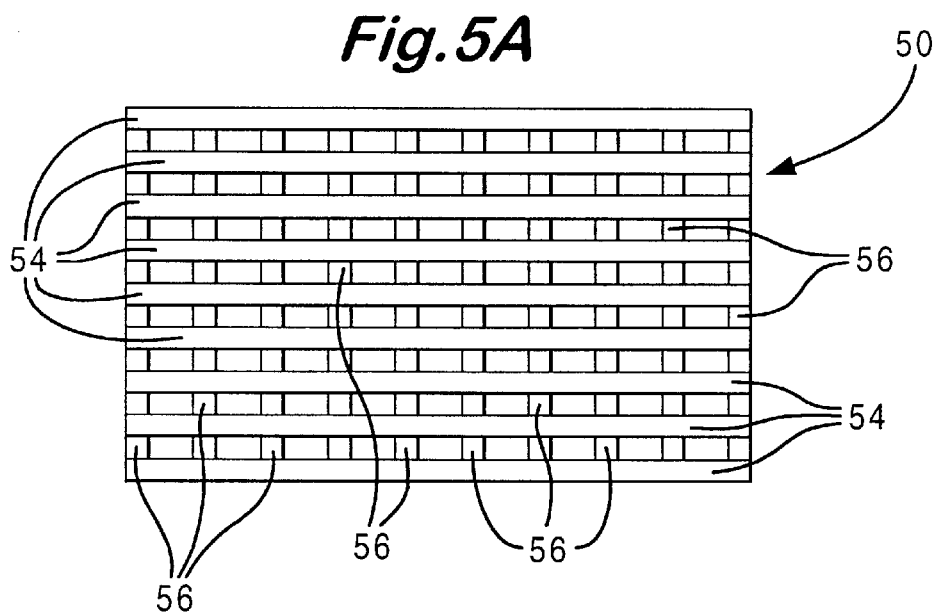
FIG. 5A is a cross-section view of a various screen panel according to the present invention.
Figure 5B:
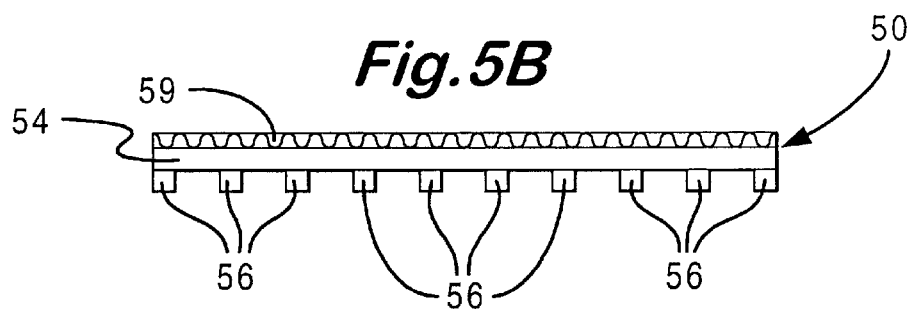
FIG. 5B is a side view of the screen of FIG. 5A.

FIG. 5A shows a panel 50 according to the present invention with a series of spaced-apart strips 54 which are substantially parallel and substantially in the same plane. A second series of spaced-apart strips 56 underlie and are connected to (or formed integrally with) the series of strips 54. Together the series of strips define openings 58 (as viewed from above). As shown in FIG. 5B, a layer of screening material 59 is secured to the top surfaces of the strips 54 and does not touch the strips 56. Alternatively, or in addition to the screening material shown in FIG. 5B, screening material may be applied to the bottom surfaces of the strips 56. Any multi-layer screening material described herein may be bonded or fused together and/or may be adhered to a strip and/or crossmember by any method and/or adhesive disclosed herein and/or by any suitable known method and/or adhesive. The crossmembers in any panel or screen assembly disclosed herein may be any suitable size, shape, and configuration, including, but not limited to, as shown in FIGS. 1A, 1G, 2A, or FIGS. 3A–5B.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A method for screening drilling fluid with particles suspended therein flowing to a vibratory shaker, the method comprising flowing the drilling fluid with particles suspended therein to a screen assembly on a vibratory shaker, the screen assembly comprising a screen assembly mounted on the vibratory shaker in a generally horizontal disposition, a flat panel with a plurality of spaced-apart holes therethrough, the panel having a first end spaced-apart from a second end by two spaced-apart sides, the first end parallel to the second end and the two spaced-apart sides parallel to each other, a plurality of flat strips spaced-apart across the panel, each of the plurality of strips in a first flat plane, the strips of the plurality of strips parallel to each other and extending from the first end to the second end of the panel, a plurality of crossmembers each of which has two ends, one end connected to one of the strips and the other end connected to another strip, each of the crossmembers having a major portion in a second flat plane different from the first flat plane of the plurality of strips, each crossmember contacting only two of the strips of the plurality of strips, no crossmember contacting another crossmember, the crossmembers of the plurality of crossmembers parallel to each other and parallel to the ends of the panel, the strips and crossmembers defining the plurality of spaced-apart holes through the panel, and screening material on the plurality of strips covering the plurality of holes for screening the drilling fluid with particles suspended therein, the screening material having a top and a bottom so that the drilling fluid with suspended particles therein flows onto the top of the screening material which is vibrated by the vibratory shaker and fluid flows downwardly through the screening material from top to bottom while suspended particles unable to move through the screen are separated from fluid and move across the top of the screen for collection, and flowing the drilling fluid through the screening material.

2. The method of claim 1 wherein the crossmembers have a series of holes therethrough for fluid flow, the method further comprising flowing drilling fluid through the series of crossmember holes.

3. The method of claim 2 wherein each crossmember has a portion of each end in the first flat plane.

4. The method of claim 1 wherein the first flat plane and the second flat plane are generally horizontal.

5. The method of claim 1 wherein the screen assembly has a pair of spaced-apart hookstrips on opposite sides of the panel for releasably securing the panel to a vibratory shaker, the method further comprising securing the hookstrips to the vibratory shaker.

6. A screen assembly for a vibratory shaker for treating drilling fluid with particles suspended therein, the screen assembly comprising the screen assembly for mounting on the vibratory shaker in a generally horizontal disposition, a flat panel with a plurality of spaced-apart holes therethrough, the panel having a first end spaced-apart from a second end by two spaced-apart sides, the first end parallel to the second end and the two spaced-apart sides parallel to each other, a plurality of flat strips spaced-apart across the panel, each of the plurality of strips in a first flat plane, the strips of the plurality of strips parallel to each other and extending from the first end to the second end of the panel, a plurality of crossmembers each of which has two ends, one end connected to one of the strips and the other end connected to another strip, each of the crossmembers having a major portion in a second flat plane different from the first flat plane of the plurality of strips, each crossmember contacting only two of the strips of the plurality of strips, no crossmember contacting another crossmember, the crossmembers of the plurality of crossmembers parallel to each other and parallel to the ends of the panel, the strips and crossmembers defining the plurality of spaced-apart holes through the panel, and screening material on the plurality of strips covering the plurality of holes for screening the drilling fluid with particles suspended therein, the screening material having a top and a bottom so that drilling fluid with suspended particles therein to be treated by the vibratory shaker flows onto the top of the screening material which is vibrated by the vibratory shaker and fluid flows downwardly through the screening material from top to bottom while suspended particles unable to move through the screen are separated from fluid and move across the top of the screen for collection.

7. The screen of claim 6 wherein each crossmember is connected to and between adjacent strips.

8. The assembly of claim 6 wherein the screening material is above and not in contact with the plurality of crossmembers.

9. The assembly of claim 8 wherein the screening material is secured to the plurality of strips.

10. The assembly of claim 6 wherein the screening material is on a top surface of each of the plurality of strips and on and in contact with a top surface of each of the crossmembers.

11. The assembly of claim 10 wherein the screening material is secured to the plurality of strips.

12. The assembly of claim 6 wherein the screening material is a single layer of screening material.

13. The assembly of claim 6 wherein the screening material comprises a plurality of layers of screening material.

14. The assembly of claim 13 wherein the layers of screening material are bonded to each other.

15. The assembly of claim 14 wherein the layers of screening material are bonded together by a plastic grid or by glue.

16. The assembly of claim 6 wherein the plurality of crossmembers are substantially beneath the plurality of strips.

17. The assembly of claim 6 wherein the crossmembers have a series of crossmember holes therethrough for fluid flow.

18. The assembly of claim 6 wherein each strip of the plurality of strips has a top surface and a bottom surface and screening material is on the top surfaces and on the bottom surfaces of the strips.

19. The assembly of claim 6 further comprising a pair of spaced-apart hookstrips on opposite sides of the panel for releasably securing the panel to a vibratory shaker.

20. A panel for supporting screening material of a screen assembly for a vibratory shaker for treating drilling fluid with particles suspended therein, the screen assembly for mounting on the vibratory shaker in a generally horizontal disposition, the panel comprising a flat panel body with a plurality of spaced-apart holes therethrough, the panel body having a first end spaced-apart from a second end by two spaced-apart sides, the first end parallel to the second end and the two spaced-apart sides parallel to each other, a plurality of flat strips in a first flat plane and spaced-apart across the panel, each of the plurality of strips in the same first flat plane, the strips of the plurality of strips parallel to each other and extending from the first end to the second end of the panel, and a plurality of crossmembers each of which has two ends, one end connected to one of the strips and the other end connected to another strip, each of the crossmembers having a major portion in a second flat plane different from the first flat plane of the plurality of strips, each crossmember contacting only two of the strips of the plurality of strips, no crossmember contacting another crossmember, the crossmembers of the plurality of crossmembers parallel to each other and parallel to the ends of the panel body, the strips and crossmembers defining the plurality of spaced-apart holes through the panel body.

21. The panel of claim 20 wherein each crossmember is connected to and between adjacent strips.

22. The panel of claim 20 wherein the plurality of crossmembers are substantially beneath the plurality of strips.

23. The panel of claim 20 wherein the crossmembers have a series of holes therethrough for fluid flow.

24. The panel of claim 20 wherein each strip of the plurality of strips has a top surface and a bottom surface and screening material is on the top surfaces and on the bottom surfaces of the strips.

25. The panel of claim 20 further comprising a pair of spaced-apart hookstrips on opposite sides of the panel body for releasably securing the panel body to a vibratory shaker.

* * * * *